(12) United States Patent
Kraus et al.

(10) Patent No.: US 7,425,596 B2
(45) Date of Patent: Sep. 16, 2008

(54) USE OF BLOCK COPOLYMERS AS DISPERSANTS FOR AQUEOUS SUSPENSIONS OF SOLIDS

(75) Inventors: Alexander Kraus, Tacherting (DE); Christian Hübsch, Gmund (DE); Gerhard Albrecht, Tacherting (DE); Harald Grassl, Schönau (DE); Angelika Hartl, Tacherting (DE); Stefanie Scheul, Trostberg (DE); Alfred Kern, Kirchweidach (DE)

(73) Assignees: Goldschmidt GmbH (DE); Construction Research & Technology GmbH (DE)

( * ) Notice: Subject to any disclaimer, the term of this patent is extended or adjusted under 35 U.S.C. 154(b) by 0 days.

(21) Appl. No.: 10/525,299

(22) PCT Filed: Aug. 13, 2003

(86) PCT No.: PCT/EP03/09005

§ 371 (c)(1),
(2), (4) Date: Feb. 14, 2005

(87) PCT Pub. No.: WO2004/016668

PCT Pub. Date: Feb. 26, 2004

(65) Prior Publication Data

US 2005/0228142 A1    Oct. 13, 2005

(30) Foreign Application Priority Data

Aug. 14, 2002   (DE) ............................... 102 37 286

(51) Int. Cl.
C08F 20/02   (2006.01)
(52) U.S. Cl. ................................... 525/329.7
(58) Field of Classification Search ............... 525/329.7
See application file for complete search history.

(56) References Cited

U.S. PATENT DOCUMENTS

| | | | |
|---|---|---|---|
| 3,932,369 A | 1/1976 | Sartori et al. | |
| 4,029,720 A | 6/1977 | Seiler et al. | |
| 4,927,961 A | 5/1990 | Fock et al. | |
| 5,177,151 A | 1/1993 | Yu | |
| 5,484,851 A | 1/1996 | Fock | |
| 5,707,445 A | 1/1998 | Yamato et al. | |
| 5,763,548 A | 6/1998 | Matyjaszewski et al. | |
| 6,248,839 B1* | 6/2001 | Esselborn et al. | 525/329.7 |
| 2005/0080298 A1* | 4/2005 | Inaoka et al. | 568/679 |

FOREIGN PATENT DOCUMENTS

| | | |
|---|---|---|
| DE | 1 671 017 | 9/1971 |
| EP | 0 214 412 A1 | 3/1987 |
| EP | 0 306 449 A2 | 3/1989 |
| EP | 0 870 781 A1 | 10/1998 |
| EP | 0 979 844 A2 | 2/2000 |
| EP | 1 110 981 A2 | 6/2001 |
| EP | 1 142 847 A2 | 10/2001 |
| WO | WO 01/51534 A1 | 7/2001 |

OTHER PUBLICATIONS

Uchikawa H., Hanehara, S. and Sawaki, D., The Role of Steric Repulsive Force in the Dispersion of Cement Particles in Fresh Paste Prepared With Organic Admixture, Cement and Concrete Research, vol. 27, No. 1, pp. 37-50, 1997.
Yoshioka, Kazuhiro, Role of Steric Hindrance in the Performance of Superplasticizers for Concrete, J. Am. Cerumic Socieity, 80 [10] pp. 2667-2671 (1997.).
Uchikawa, H., Hanehara, S. and Sawaki, D., The Role of Steric Repulsive Force in the Dispersion of Cement Particles in Fresh Paste Prepared With Organic Admixture, Cement and Concrete Research, vol. 27, No. 1, pp. 37-50, 1997.

* cited by examiner

*Primary Examiner*—Robert D. Harlan
(74) *Attorney, Agent, or Firm*—Fitch, Even, Tabin & Flannery

(57) ABSTRACT

The use of block copolymers which were prepared by polymerization of a poly(alkylene oxide) compound (A) with at least one ethylenically unsaturated monomer compound (B), as dispersants for aqueous suspensions of solids, in particular based on hydraulic binders, such as, for example, cement, lime, gypsum or anhydrite, is described. Surprisingly, these block copolymers have a substantially better water-reducing power at the same dose in comparison with conventional superplasticizers based on comb polymers. Moreover, the slump loss can also be reduced in comparison with conventional superplasticizers by modification of the adhesive block.

36 Claims, No Drawings

USE OF BLOCK COPOLYMERS AS DISPERSANTS FOR AQUEOUS SUSPENSIONS OF SOLIDS

The present invention relates to the use of block copolymers which were prepared by polymerization of a poly(alkylene) oxide compound (A) with an ethylenically unsaturated monomer compound (B), as dispersants and/or superplasticizers for aqueous suspensions of solids, in particular based on hydraulic binders, such as, for example, cement, lime, gypsum or anhydrite.

In aqueous suspensions of pulverulent inorganic or organic substances, such as hydraulic binders (cement, lime, gypsum or anhydrite), crushed rock, silicate powder, chalk, clays, porcelain slip, talc, pigments, carbon black or plastics powders, additives are often introduced in the form of dispersants in order to improve their processability, i.e. kneadability, flowability, sprayability, brushability or pumpability. By adsorption onto the surfaces of the particles, these additives are capable of breaking up agglomerates and dispersing the particles formed. Particularly in the case of highly concentrated dispersions, this leads to a substantial improvement in the processability.

In the preparation of mixtures of building materials which contain hydraulic binders, such as cement, lime gypsum or anhydrite, this effect can be particularly advantageously utilized since otherwise substantially more water would be required for achieving a processable consistency than would be required for the subsequent hydration or hardening process. The water which gradually evaporates after the hardening leaves behind cavities which have a significant adverse effect on the mechanical properties and stabilities of the structures.

In order to reduce the excess proportion of water after hydration and/or to optimize the processability at a predetermined water/binder ratio, additives which are generally referred to as superplasticizers are used.

The superplasticizers still most frequently used are polycondensates based on naphthalene- or alkylnaphthalane-sulfonic acids (cf. EP-A 214 412) and melamine/formaldehyde resins which contain sulfo groups (German Patent 16 71 017).

However, these superplasticizers have the disadvantage that their good plasticizing effect—in particular in concrete construction—persists only for a relatively short time span even at relatively high doses. This decrease in the flowability of concrete mixes is also referred to as slump loss. It leads to problems particularly when relatively long time spans occur between the production of the concrete and the incorporation thereof, as often occurs due to long transport or conveying distances.

Furthermore, the liberation of the toxic formaldehyde contained as a result of the production can lead to adverse work hygiene effects if the application takes place indoors (production of prefabricated concrete paths or drying of gypsum plasterboard) or in mining or tunnel construction.

In order to overcome these disadvantages, formaldehyde-free superplasticizers based on maleic monoesters and styrene were also developed (cf. EP-A 306 449). Although a high dispersing power over a sufficient period (low slump loss) can be ensured with these additives, the positive properties are rapidly lost on storage of the aqueous formulations of these superplasticizers. The short shelf-life of these superplasticizer solutions is due to the easy hydrolyzability of the maleic monoesters.

In order to overcome this problem, various superplasticizers stable to hydrolysis were developed. All these superplasticizers are copolymers of ethylenically unsaturated carboxylic acids (such as, for example, acrylic acid, methacrylic acid or maleic acid or salts thereof) and poly(alkylene oxides) having a polymerizable terminal group (such as, for example, methacrylates, allyl ethers or vinyl ethers). The incorporation of these long-chain monomers into a polymer chain leads to polymers having a comb-like structure (cf. U.S. Pat. No. 5,707,445, EP 1 110 981 A2, EP 1 142 847 A2).

These comb polymers are distinguished not only by a long shelf-life but also by substantially improved efficiency in comparison with superplasticizers based on lignin, naphthalene or melamine condensate.

According to a further accepted theory, the efficiency of the superplasticizers is based on two different effects. Firstly, the negatively charged acid groups of the superplasticizers are adsorbed on the cement particle surface positively charged by means of calcium ions. The electrostatic double layer (zeta potential) thus formed leads to an electrostatic repulsion between the particles. The repulsive forces caused by the zeta potentials, however, have only short ranges (cf. H. Uchikawa, Cement and Concrete Research 27 [1] 37-50 (1997)).

Furthermore, however, the physical presence of the adsorbed superplasticizer also prevents the surfaces of the cement particles from being able to come into contact with one another. This steric repulsive effect is dramatically enhanced by the unadsorbed side chains of the abovementioned comb polymers (cf. K. Yoshioka, J. Am. Ceram. Soc. 80 [10] 2667-71 (1997)). It is obvious that the sterically caused repulsive effect can be influenced both by the length of the side chains and by the number of side chains per main chain. On the other hand, a side chain density or length which is too high can hinder the adsorption on the cement particle surface. In order to determine the degree of adsorption of a superplasticizer on cement particles, the content of organic material in the superplasticizer is determined after addition of said superplasticizer to the mixing water (TOC analysis). After the cement has been stirred in and after a short waiting time, the cement paste is pressed and the collected pore water is again analyzed by means of TOC. The decrease in the TOC value now corresponds to the proportion of the adsorbed superplasticizer. On the basis of such measurements, it was possible to show that large parts of the superplasticizer are not adsorbed. This is not surprising since the side chains are present in solution not in the extended form but presumably rather in coiled form. Thus, carboxylate groups in the immediate neighborhood of the side chain are spatially shielded from the cement particle and cannot contribute to the adsorption. Moreover, the preparation of the superplasticizers via free radical copolymerization of a plurality of different monomers leads to relatively nonuniform products with regard to molecular weight and side chain density. It is therefore not surprising that a part of these superplasticizers are not adsorbed on the cement particle surface but remain dissolved in the pore water. When the main chain is too short or the side chain density too high, for example, the number of carboxyl groups accessible for the cement particle surface cannot be sufficient. Main chains which are too long and have a low side chain density can, on the other hand, bridge cement particles and thus promote flocculation. Presumably, these unadsorbed fractions make no contribution to the water-reducing power of the superplasticizer.

As already mentioned, the polymeric superplasticizers for cement-containing systems according to the prior art to date are copolymers having a comb-like structure which are prepared via free radical polymerization. All these products are distinguished by high nonuniformity with regard to the number of side chains per polymer molecule and with regard to the molecular weight. However, it is known that an optimum molecular weight and an optimum number of side chains per polymer molecule exist for each application and each cement type. All components of a product which deviate from this optimum therefore reduce the efficiency of the product or necessitate larger doses.

It was therefore the object of the present invention to provide polymer compounds which do not have said disadvantages of the prior art but, owing to an increased product uniformity and a low proportion of less effective components, have a substantially improved effect as dispersants or superplasticizers for aqueous suspensions of solids.

This object was achieved by the use of block copolymers which were prepared by polymerization of a poly (alkylene) oxide compound (A) with at least one ethylenically unsaturated monomer compound (B).

Surprisingly, block copolymers which preferably consist of only a poly(oxyalkylene) chain with a terminally grafted-on adhesive block have a substantially better water-reducing power at the same dose than conventional superplasticizers based on comb polymers. By modification of the adhesive block, it is also possible to reduce the slump loss in comparison with conventional superplasticizers, which was likewise not foreseeable.

The block copolymers used according to the invention consist of at least two polymeric building blocks of different chemical composition which were prepared by polymerization of a poly(alkylene) oxide compound (A) with an ethylenically unsaturated monomer compound (B).

Block copolymers having the structure A'-B', i.e. block copolymers which have exactly one block A' formed from a poly(alkylene oxide) compound (A) and exactly one block B' formed from one or more different ethylenically unsaturated monomer compound (B) are particularly preferred.

The preparation of the block copolymers is preferably effected by grafting onto that end of the poly(alkylene oxide) compound (A) which is substituted by the building block Z, by polymerizing on the monomer compound (B) either by free radical, anionic or cationic polymerization. The building block Z performs the function of polymerization initiator. Free radical polymerization is preferred here, in particular techniques of controlled or living free radical polymerization, since these tolerate a large number of different functional groups and solvents. The method of "atom transfer radical polymerization", abbreviated below to ATRP, is to be regarded as being very particularly preferred.

The poly(alkylene oxide) compound (A) used according to the invention corresponds here to the general formula I

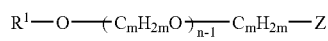
(I)

in which $R^1$ has the following meaning: a hydrogen atom, an aliphatic hydrocarbon radical having 1 to 20 C atoms, a cycloaliphatic radical having 5 to 12 C atoms or an aryl radical having 6 to 14 C atoms which may optionally also be substituted. The following is applicable for the indices: m=2 to 4 and n=1 to 25, where m can preferably assume the values 2 or 3 and n preferably values of from 5 to 250 and even more preferably values of from 20 to 135.

Cyclopentyl or cyclohexyl radicals are to be regarded as preferred cycloalkyl radicals, and phenyl or naphthyl radicals which in particular may also be substituted by hydroxyl, carboxyl or sulfo groups are to be regarded as preferred aryl radicals.

In the context of the present invention, the building block Z in formula I may have the following meanings: Z may be derived from 2-haloalkylcarboxylic acid derivatives of the general formula III:

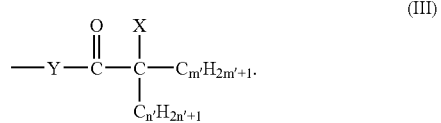
(III)

Here, X may be Cl, Br or I, m' may be 1 to 4 and n' may be 0, 1 or 2, m'=1 and n'=0 or 1 being preferred. Y may be O or $NR^2$ and $R^2$ may be H, an alkyl radical having 1 to 12 C atoms or an aryl radical having 6 to 14 C atoms and

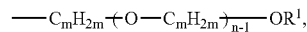

$R^1$, m, and n having the abovementioned meaning. $R^2$ is preferably H, $CH_3$ or $C_2H_5$.

Z may furthermore be derived from the arylsulfonyl halide derivatives according to formula IV:

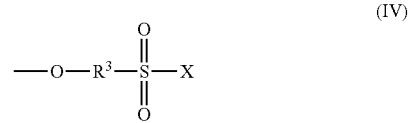
(IV)

Here, X is once again Cl or Br, preferably Cl. $R^3$ may be an aromatic radical having 6 to 14 C atoms, preferably a phenyl or naphthyl radical, which may also be substituted by halo, hydroxyl, $C_1$-$C_{12}$-alkoxy, $C_1$-$C_{12}$-dialkylamino or carboxyl groups.

In the context of the present invention, the building block Z may finally also be chain-transferring groups in the form of thiols, secondary amines, phosphines or derivatives of phosphorous acid according to the general formula V

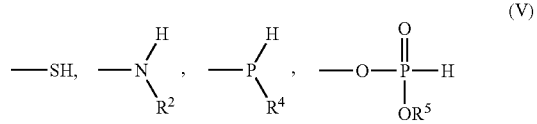
(V)

in which $R^4$ is H, a $C_1$-$C_{12}$-alkyl radical, a $C_5$-$C_8$-cycloalkyl radical, a $C_8$-$C_{14}$-aryl radical optionally substituted by hydroxyl, carboxyl or sulfo groups, or

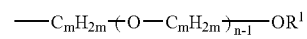

and $R^5$ is $C_1$-$C_{12}$-alkyl, $C_6$-$C_{14}$— aryl or

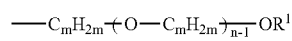

and $R^1$, $R^2$, m and n have the abovementioned meaning. Preferred alkyl radicals are methyl or ethyl, preferred cycloalkyl radicals are cyclopentyl or cyclohexyl and preferred aryl radicals are phenyl or naphthyl.

The preparation of the poly(alkylene oxide) compound (A) is effected by reacting the haloalkylcarboxylic acid of the general formula II or arylsulfonyl halides of the formula III with corresponding poly(alkylene oxide) derivatives (such as, for example, monoalkyl ethers) by known methods, where the poly(alkylene oxide) compound (A) may be regarded as a macroinitiator.

If Z is a chain-transferring group, the poly(alkylene oxide) compound (A) may also be regarded as a macromolecular chain transfer agent which is reacted with the monomer component (B) in a conventional free radical polymerization. In the case of this synthesis route, which can be carried out by the known methods, the building block Z is a group which is capable of acting as a chain transfer agent in a free radical polymerization. Owing to their high chain transfer rate, thiol groups are preferably used here. The synthesis of the corresponding functionalized poly (alkylene oxides) correspond to the general prior art.

For the preparation of the block copolymers used according to the invention, the poly(alkylene oxide) compound (A) is reacted with at least one ethylenically unsaturated monomer compound (B) which forms the block B. In the case of the block copolymers used according to the invention, the designation "block" means that it is a polymer building block which has a chemical composition differing from that of block A, which is derived from the poly(alkylene oxide) compound (A). Block B may be both a homopolymer which is composed only of one type of monomer and a copolymer consisting of a plurality of types of monomers. If a plurality of types of monomers are used, these can be polymerized according to the prior art preferably by means of ATRP, either randomly, blockwise or blockwise with random intermediate zones. A gradient structure along the polymer chain is also possible.

Furthermore, the ATRP also permits the synthesis of branched polymer chains. The block copolymers used according to the invention can therefore have a linear or branched block B. The block copolymers according to the invention preferably have a linear block B which is composed of one type of monomer, a linear block B which consists of a randomly composed copolymer or a branched block B which consists of a randomly composed copolymer. Suitable monomers are ethylenically unsaturated compounds capable of undergoing (free radical) polymerization, in particular acrylates, methacrylates and styrene derivatives of the general formula (II)

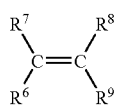

(II)

$R^6$ and $R^7$ may be H, $CH_3$, COOH or salts thereof, $COOR^{10}$ or $CONR^{10}R^{10}$, alkali metal (sodium, potassium), alkaline earth metal (calcium) or ammonium salts preferably being used as carboxylic acid salts, and $R^{10}$ is H, $C_1$-$C_{12}$-alkyl, $C_1$-$C_{12}$-hydroxyalkyl,

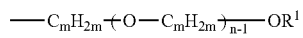

and $R^1$, m and n have the abovementioned meaning. In formula II, $R^6$ and $R^9$ together may be —O—CO—O—, so that the corresponding monomers are derived from maleic anhydride. $R^6$ may he H, $CH_3$ or $CH_2$—$COOR^{10}$, $R^{10}$ having the abovementioned meaning. $R^9$ may be $COOR^{10}$, an optionally substituted $C_6$-$C_{14}$-aryl radical or $OR^{11}$, where $R^{11}$=acetyl or

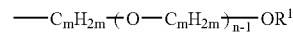

and $R^1$, $R^{10}$, m and n have the abovementioned meaning.

For the block copolymers prepared according to the invention, monomer compounds in which $R^6$ and $R^7$ are H or $R^6$ and $R^9$ together are O—CO—O, $R^8$ is H, $CH_3$ or $CH_2$—$COOR^{10}$ and $R^9$ is COOR10 or a phenyl radical optionally substituted by hydroxyl, carboxyl or sulfo groups are preferably used. Preferably, $R^6$ and $R^7$ are H, $R^8$ is H or $CH_3$ and $R^9$ is $COOR^{10}$ and very particularly preferably $R^6$ and $R^7$ are H, $R^8$ is H or $CH_3$, $R^9$ is COOH or salts thereof or $COOR^{12}$ and $R^{12}$ is tert-butyl or $C_1$-$C_6$-hydroxyalkyl.

Furthermore, according to a preferred embodiment, branches can be introduced in a targeted manner into the block B of the block copolymers used according to the invention if, in addition to the monomer compounds (B), so-called inimers are also incorporated as polymerized units into the block B. An inimer is understood as meaning a compound which has both a polymerizable ethylenically unsaturated double bond and a group which can have an initiating effect in the context of ATRP. Particularly suitable inimers are prepared by esterification of hydroxy-functionalized monomers, such as, for example, hydroxyethyl methacrylate (HEMA) using ATRP initiators, such as 2-halopropionic acids or 2-haloisobutyric acids.

Furthermore, it is also possible to use inimers prepared by sulfochlorination of styrene in the preparation according to the invention.

The preparation of the block copolymers prepared according to the invention is effected—as described above—by known methods, free radical polymerization and in particular ATRP being regarded as preferred.

According to a preferred embodiment, the reaction is effected in a temperature range of 20 to 110° C., depending on the solvent. In aprotic solvents or in the case of bulk polymerizations, in general temperatures of from 50 to 110° C., preferably from 60 to 90° C., are used. In protic solvents, in particular water, the polymerization begins under certain circumstances at as low as 20° C.

The ratios of poly(alkylene oxide) compound (A) to monomer compound (B) can be varied within wide limits, but it has proven particularly advantageous to set this ratio of (A) to (B) to 1:5 to 1:300, in particular 1:15 to 1:80.

As is known to the person skilled in the art in the area of ATRP, halides or oxides of transition metals of low oxidation state, which are complexed by (generally polydentate) ligands and brought (at least partly) into solution are used as catalysts. The most commonly used are Cu(I) oxide, chloride or bromide, Fe(II) chloride or sulfate and Ni(II) chloride or bromide. Generally used ligands are 2,2'-bipyridine (optionally also substituted), pentamethyldiethylenetriamine (PMDETA), tris(2-dimethylaminoethyl)amine, triphenylphosphine or Schiff's bases of 2-pyridinealdehyde and primary amines. For complexing of Cu—I salts, in general two mole equivalents are used in the case of bidentate ligands or one mole equivalent is used in the case of tridentate or tetradentate ligands.

If the preparation of the block copolymers used according to the invention is effected via free radical polymerization, it is possible to rely on the customary azo or peroxo initiators.

The block copolymers proposed according to the invention are outstandingly suitable as superplasticizers or dispersants for aqueous suspensions of solids, the block copolymers preferably being used in an amount of from 0.01 to 5% by weight, based on the weight of the suspension of solids. Here, the suspension of solids can contain inorganic particles selected from the group consisting of crushed rock, silicate powder, chalk, clays, porcelain slip, talc, pigments and carbon black or organic particles, such as, for example, plastics powders. The use of the block copolymers proposed according to the invention for aqueous binder suspensions based on cement, lime, gypsum and anhydrite is to be regarded as particularly preferred. There, the block copolymers have a substantially better water-reducing power at the same dose than conventional superplasticizers based on comb copolymers. Moreover, when the block copolymers are used according to the invention, a reduced slump loss compared with conventional superplasticizers can also be found.

The examples which follow are intended to illustrate the invention in more detail.

EXAMPLES

A) Preparation of poly(alkylene oxide) compound (A) (ATRP macroinitiators) according to formula I The preparation method used was the azeotropic esterification with carboxylic acids.

For this purpose, a two-necked flask is equipped with stirrer, water separator and reflux condenser. The flask is filled with 0.1 mol of the corresponding poly (alkylene oxide) monoalkyl ether and with 0.5 mol of bromoisobutyric acid or bromopropionic acid, 0.005 mol of p-toluenesulfonic acid and 50 ml of toluene. The reaction mixture is refluxed while stirring until no more water is separated off.

Thereafter, 500 ml of methanol are added and refluxing is carried out while stirring until free carboxylic acid is no longer detectable in the reaction mixture by means of GC, HPLC or TLC. The excess methanol is removed by distillation together with the resulting methyl ester of bromoisobutyric acid or of bromopropionic acid. The distillation residue consists of the desired ATRP macroinitiator. Further purification steps are generally not necessary.

The following ATRP macroinitiators were synthesized according to this method:

Starting from polyethylene glycol monomethyl ethers having the average molecular weights
a) 500 g/mol of the corresponding bromoisobutyric esters (1)
b) 1100 g/mol of the corresponding bromoisobutyric esters (2)
c) 2000 g/mol of the corresponding bromopropionic esters (3)
d) 5000 g/mol of the corresponding bromopropionic esters (4)

B) Preparation of different block copolymers according to the invention by ATRP

"Atom transfer radical polymerization" was effected in a three-necked flask which was equipped with a gas-tight stirrer, condenser, nitrogen inlet tube and vacuum connection. The monomer used was tert-butyl methacrylate, which had been rendered inhibitor-free beforehand by filtration over a bed of basic alumina.

First, the respective macroinitiator (1 to 4) was melted and was initially introduced into the flask together with pentamethyldiethylenetriamine (PMDETA) as a complexing agent and the tert-butyl methacrylate (t-BMA). The apparatus and the reaction mixture were then rendered oxygen-free by repeated application of a vacuum, in each case followed by flooding with nitrogen. Thereafter, copper(I) chloride was added as a catalyst and freedom from oxygen was once again ensured. The amounts of the starting materials are shown in table 1.

The reaction mixture was then heated to 90° C. for two hours while stirring. After two hours, the highly viscous reaction mixture was cooled and traces of unconverted monomer were distilled off in vacuo.

The block copolymer according to the invention which was thus obtained was dissolved in dioxane, 5 g of sulfuric acid were added and refluxing was effected for two hours with stirring. Cleavage of the tert-butyl ester groups occurs with elimination of gaseous isobutylene, and carboxyl groups are formed. After the end of the gas evolution, the dioxane was removed by distillation. The block copolymer according to the invention which was obtained was dissolved in three times the amount of water, the pH being adjusted to 8 by means of aqueous NaOH solution. The exact determination of the solids content of the solution was effected by evaporating the water on a heatable balance at 130° C. to constant weight.

The average molecular weights were determined by means of GPC. The mobile phase used was a mixture of 80% by volume of aqueous 5% strength ammonium formate solution and 20% by volume of acetonitrile. HEMA columns were used as stationary phases and the calibration in the case of RI detection was effected by means of different polyethylene glycol standards. Since the synthesized polymers are copolymers, the molecular weights determined via polyethylene glycol calibration may differ slightly from the real values.

The stoichiometries of the respective polymerization batches and the average molecular weights and polydispersities determined by means of GPC are shown in table 1.

TABLE 1

Linear block copolymers

| Macro-initiator No. | Macroinitiator | | t-BMA | | CuCl | | PMDETA | | Prod. No. | $M_w$ after hydrolysis [g/mol] | $M_n/M_w$ after hydrolysis |
|---|---|---|---|---|---|---|---|---|---|---|---|
| | [mol] | [g] | [mol] | [g] | [mol] | [g] | [mol] | [g] | | | |
| 1 | 0.046 | 30 | 0.25 | 35 | 0.046 | 4.51 | 0.046 | 8.1 | 1-1 | 1260 | 1.18 |
| 1 | 0.031 | 20 | 0.46 | 65 | 0.031 | 3.04 | 0.031 | 5.5 | 1-2 | 2150 | 1.29 |
| 1 | 0.015 | 10 | 0.46 | 65 | 0.015 | 1.47 | 0.015 | 2.6 | 1-3 | 3580 | 1.33 |
| 2 | 0.032 | 40 | 0.32 | 45 | 0.032 | 3.14 | 0.033 | 5.6 | 2-1 | 2470 | 1.32 |
| 2 | 0.024 | 30 | 0.49 | 70 | 0.024 | 2.35 | 0.024 | 4.2 | 2-2 | 4360 | 1.18 |
| 2 | 0.016 | 20 | 0.63 | 90 | 0.016 | 1.57 | 0.016 | 2.7 | 2-3 | 5100 | 1.20 |
| 3 | 0.021 | 45 | 0.21 | 30 | 0.021 | 2.06 | 0.021 | 3.7 | 3-1 | 4490 | 1.36 |
| 3 | 0.011 | 24 | 0.42 | 60 | 0.011 | 1.08 | 0.011 | 1.9 | 3-2 | 6300 | 1.24 |
| 3 | 0.0056 | 12 | 0.42 | 60 | 0.006 | 0.55 | 0.006 | 1 | 3-3 | 9280 | 1.09 |
| 4 | 0.0106 | 55 | 0.32 | 45 | 0.011 | 1.04 | 0.011 | 1.9 | 4-1 | 9160 | 1.27 |
| 4 | 0.0053 | 27 | 0.28 | 40 | 0.005 | 0.52 | 0.005 | 0.9 | 4-2 | 10660 | 1.23 |
| 4 | 0.0053 | 27 | 0.42 | 60 | 0.005 | 0.52 | 0.005 | 0.9 | 4-3 | 13530 | 1.29 |

Furthermore, a block copolymer according to the invention and having a branched polymethacrylic acid block was also synthesized by using an inimer. The reaction was carried out as described above, except that here, in addition to the macroinitiator (2), hydroxyethyl methacrylate isobromobutyric ester was added as an inimer. The further working-up was effected as described above.

The stoichiometries of the respective polymerization batches and the average molecular weights and polydispersities determined by means of GPC are shown in table 2.

TABLE 2

Block copolymers having a branched poly(methacrylic acid) block

| Macro-initiator No. | Macro-initiator [mmol] | [g] | Inimer [mmol] | [g] | t-BMA [mol] | [g] | CuCl [mmol] | [g] | PMDETA [mmol] | [g] | Prod. No. | $M_w$ after hydrolysis [g/mol] | $M_n/M_w$ after hydrolysis |
|---|---|---|---|---|---|---|---|---|---|---|---|---|---|
| 2 | 5 | 6.34 | 5 | 1.4 | 0.35 | 50 | 10 | 1 | 10 | 1.7 | 2-4 | 20750 | 1.29 |
| 2 | 20 | 25 | 20 | 5.6 | 0.35 | 50 | 40 | 4 | 40 | 6.9 | 2-5 | 6000 | 1.27 |

C) Cement paste tests for determining the water-reducing power

By mixing the abovementioned block copolymers according to the invention with cement paste, the water-reducing power was tested in comparison with the commercially available concrete additive Glenium®-27. The Glenium®-27 is a random comb polymer of polymethacrylic acid with polyethylene glycol side chains. The side chains have an average molecular weight of about 1100 g/mol.

For testing the water-reducing power, a cement of the type "Almendingen 32.5 NW-HS" was mixed with water in the ratio w/c=0.32 and the respective concrete additive (Glenium®-27 or one of the block copolymers according to the invention which are described above) was added in a dose of 0.2% by weight solid/cement (cf. table 3).

For determining the degree of mini-slump, a truncated cone (D/d/H=40/20/60 mm) is used. With the aid of a small attached funnel, the truncated cone is filled with the binder paste without a compacting effect and the projecting paste is scraped off. After the cone has been raised, the slump is determined.

The results of various cement paste slump tests are summarized in table 3.

TABLE 3

Results of cement paste slump tests using Almendingen 32.5 NW-HS

| Concrete additive designation | Dose, based on cement [% by wt.] | W/C | Slump [cm] |
|---|---|---|---|
| None | 0 | 0.32 | too stiff |
| Glenium ® -27 | 0.2 | 0.32 | 14.8 |
| 1-1 | 0.2 | 0.32 | 9.8 |
| 1-2 | 0.2 | 0.32 | 12.3 |
| 1-3 | 0.2 | 0.32 | 14.7 |
| 2-1 | 0.2 | 0.32 | 17.5 |
| 2-2 | 0.2 | 0.32 | 16.8 |
| 2-3 | 0.2 | 0.32 | 16.5 |
| 2-4 | 0.2 | 0.32 | 17.0 |
| 2-5 | 0.2 | 0.32 | 16.9 |
| 3-1 | 0.2 | 0.32 | 17.1 |
| 3-2 | 0.2 | 0.32 | 17.6 |
| 3-3 | 0.2 | 0.32 | 16.7 |
| 4-1 | 0.2 | 0.32 | 17.8 |
| 4-2 | 0.2 | 0.32 | 17.2 |
| 4-3 | 0.2 | 0.32 | 16.3 |

With the exception of the polymers based on (1) (polyethylene glycol monomethyl ether having a molecular weight of 500 g/mol), all other block copolymers according to the invention have a consistently better plasticizing effect in the cement paste than Glenium®-27.

D) Mortar tests for the determination of the water-reducing power and retention of the flowability over a period of 30 min The test was carried out according to (DIN EN 1015-3).

The cement used was Schelklingen CEM II 42.5 R.

TABLE 4

Results of the mortar slump tests using CEM II 42.5 R Schelklingen

| Concrete additive designation | Dose [% by wt.] | w/c [kg/kg] | s/c [kg/kg] | Slump (cm) 4 min | Slump (cm) 30 min |
|---|---|---|---|---|---|
| Glenium ®-27 | 0.2 | 0.47 | 2.7 | 24.2 | 24.3 |
| 2-1 | 0.2 | 0.45 | 2.7 | 24.0 | 22.9 |
| 2-2 | 0.2 | 0.45 | 2.7 | 25.2 | 24.3 |
| 2-3 | 0.2 | 0.45 | 2.7 | 24.7 | 24.0 |
| 1-2 | 0.2 | 0.45 | 2.7 | 22.8 | 21.8 |
| 2-4 | 0.2 | 0.45 | 2.7 | 26.7 | 24.4 |
| 2-5 | 0.2 | 0.45 | 2.7 | 27.8 | 25.7 |

The results clearly show that, even at a lower water content (w/c=0.45), the block copolymers used according to the invention generally plasticize better than Glenium®-27 at w/c=0.47. The good plasticizing effect is maintained virtually unchanged over a period of at least 30 min.

What is claimed is:

1. A method of dispersing aqueous suspensions of solids, the method comprising:
   blending block copolymers with an aqueous suspension of solids, the suspension of solids including hydraulic binders which include materials selected from the group consisting of cement, lime, gypsum, anhydrite and mixtures thereof,
   wherein the block copolymers are prepared by reacting a poly(alkylene oxide) compound of the general formula (I)

(I)

in which
$R^1$=hydrogen, a $C_1$—$C_{20}$-alkyl radical, a cycloaliphatic $C_5$—$C_{12}$-cycloalkyl radical, an optionally substituted $C_6$—$C_{14}$-aryl radical;
m=2 to 4;
n=1 to 250;
and Z is selected from the group of formulas III, IV, and V

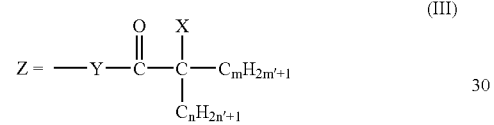
(III)

where Y=O or $NR^2$
$R^2$=H, a $C_1$—$C_{12}$-alkyl radical, a $C_6$—$C_{14}$-aryl radical, or

X=Cl or Br
m'=1 to 4
n'=0 to 2,

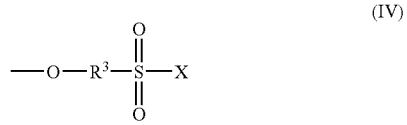
(IV)

where
$R^3$=an optionally substituted $C_6$—$C_{14}$-arylene radical
X=Cl or Br,

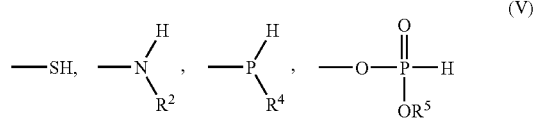
(V)

in which
$R^4$ is H, a $C_1$—$C_{12}$ alkyl radical, a $C_5$—$C_8$-cycloalkyl radical, a $C_6$—$C_{14}$-aryl radical, optionally substituted by hydroxyl, carboxyl or sulfo groups, or

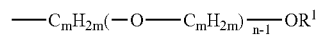

and $R^5$ is $C_1$—$C_{12}$ alkyl, $C_6$—$C_{14}$-aryl, or

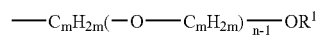

and $R^1$, $R^2$, m and n have the abovementioned meaning,
with an ethylenically unsaturated monomer compound of the general formula (II) in a free radical, anionic or cationic polymerization

(II)

in which
$R^6$ and $R^7$ may be H, $CH_3$, COOH or salts thereof, $COOR^{10}CONR^{10}$
$R^6$ and $R^9$ together may be O—CO—O
$R^8$ may be H, $CH_3$ or —$CH_2$—$COOR^{10}$
$R^9$ may be $COOR^{10}$, an optionally substituted $C_6$—$C_{14}$-aryl radical or $OR^{11}$
$R^{10}$ may be H, $C_1$—$C_{12}$-alkyl, $C_1$—$C_{12}$-hydroxyalkyl,
$R^{11}$ may be acetyl, and
$R^1$, m and n have the abovementioned meaning.

2. The method as claimed in claim 1, wherein the reaction of the poly(alkylene oxide) compound with the monomer compound is carried out in the form of a free radical polymerization.

3. The method as claimed in claim 2, wherein the reaction is effected in the form of an atom transfer radical polymerization.

4. The method as claimed in claim 1, wherein the aryl radicals for $R^1$ are also substituted by hydroxyl, carboxyl and sulfo groups.

5. The method as claimed in claim 1, wherein in formula (I), m is 2 or 3 and n is 5 to 250.

6. The method as claimed in claim 1, wherein $R^2$ is hydrogen or $C_1$—$C_2$-alkyl radical.

7. The method as claimed in claim 1, wherein m' is 1 and n' is 0 or 1.

8. The method as claimed in claim 1, wherein the arylene radical $R^3$ also has halo, hydroxyl, C—$C_{12}$-alkoxy, $C_1$—$C_{12}$-dialkylamino or carboxyl groups.

9. The method as claimed in claim 1, wherein $R^6$ and $R^7$ are H, $R^6$ and $R^9$ together are O—CO—O, $R^8$ is H, $CH_3$ or $CH_2COOR^{10}$ and $R^9$ is $COOR^{10}$ or is a phenyl radical optionally substituted by hydroxyl, carboxyl or sulfo groups.

10. The method as claimed in claim 9, wherein $R^6$ and $R^7$ are H, $R^8$=H or $CH_3$ and $R^9$=$COOR^{10}$.

11. The method as claimed in claim 10, wherein $R^6$ and $R^7$ are H, $R^8$=H or $CH_3$ and $R^9$ is COOH or salts thereof or $COOR^{12}$ where $R^{12}$ is tert-butyl or $C_1$—$C_6$-hydroxyalkyl.

12. The method as claimed in claim 1, wherein the reaction of the poly (alkylene oxide) compound and the monomer compound is carried out in the presence of a inimer compound.

13. The method as claimed in claim 12, wherein the inimer compound is prepared by esterification of hydroxy-functionalized monomers with ATRP initiators.

14. The method as claimed in claim 12, wherein the inimer compound is prepared by sulfochlorination of styrene.

15. The method as claimed in claim 1, wherein the reaction is effected in the temperature range from 20 to 110° C.

16. The method as claimed in claim 1, wherein the block copolymers are used in an amount of 0.01 to 5% by weight, based on the suspension of solids.

17. The method as claimed in claim 16, wherein the suspension of solids further includes inorganic particles selected from the group consisting of crushed rock, silicate powder, chalk, clays, porcelain slip, talc, pigments and carbon black.

18. The method as claimed in claim 16, wherein the suspension of solids contains organic particles.

19. A method of superplasticizing aqueous suspensions of solids, the method comprising:
blending block copolymers with an aqueous suspension of solids to superplasticize the suspension of solids, the suspension of solids including hydraulic binders which include materials selected from the group consisting of cement, lime, gypsum, anhydrite and mixtures thereof, wherein the block copolymers are prepared by reacting a poly(alkylene oxide) compound of the general formula (I)

in which
$R^1$=hydrogen, a $C_1$—$C_{20}$-alkyl radical, a cycloaliphatic $C_5$—$C_{12}$-cycloalkyl radical, an optionally substituted $C_6$—$C_{14}$-aryl radical;
m=2 to 4;
n=1 to 250;
and Z is selected from the group of formulas III, IV, and V

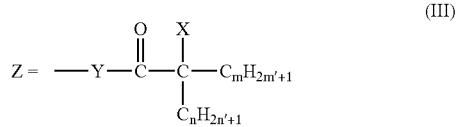

where Y=O or $NR^2$
$R^2$=H, a $C_1$—$C_{12}$-alkyl radical, a $C_6$—$C_{14}$-aryl radical, or

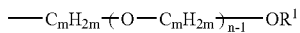

X=Cl or Br
m'=1 to 4
n'=0 to 2,

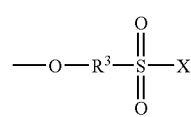

where
$R^3$=an optionally substituted $C_6$—$C_{14}$-arylene radical

X=Cl or Br,

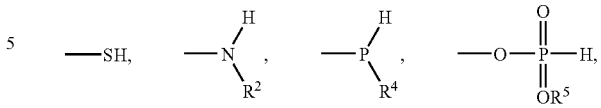

in which
$R^4$ is H, a $C_1$—$C_{12}$ alkyl radical, a $C_5$—$C_8$-cycloalkyl radical, a $C_6$—$C_{14}$-aryl radical, optionally substituted by hydroxyl, carboxyl or sulfo groups, or

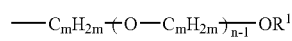

and $R^5$ is $C_1$—$C_{12}$ alkyl, $C_6$—$C_{14}$-aryl, or

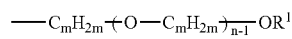

and $R^1$, $R^2$, m and n have the abovementioned meaning, with an ethylenically unsaturated monomer compound of the general formula (II) in a free radical, anionic or cationic polymerization

in which
$R^6$ and $R^7$ may be H, $CH_3$, COOH or salts thereof, $COOR^{10}$, $CONR^{10}R^{10}$
$R^6$ and $R^9$ together may be O—CO—O
$R^8$ may be H, $CH_3$ or —$CH_2$—$COOR^{10}$
$R^{10}$ may be $COOR^{10}$, an optionally substituted $C_6$—$C_{14}$-aryl radical or $OR^{11}$
$R^{10}$ may be H, $C_1$—$C_{12}$-alkyl, $C_1$—$C_{12}$-hydroxyalkyl,
$R^{11}$ may be acetyl, and
$R^1$, m and n have the abovementioned meaning.

20. The method as claimed in claim 19, wherein the reaction of the poly(alkylene oxide) compound with the monomer compound is carried out in the form of a free radical polymerization.

21. The method as claimed in claim 20, wherein the reaction is effected in the form of an atom transfer radical polymerization.

22. The method as claimed in claim 19, wherein the aryl radicals for $R^1$ are also substituted by hydroxyl, carboxyl and sulfo groups.

23. The method as claimed in claim 19, wherein in formula (I), m is 2 or 3 and n is 5 to 250.

24. The method as claimed in claim 19, wherein that $R^2$ is hydrogen or $C_1$—$C_2$-alkyl radical.

25. The method as claimed in claim 19, wherein m' is 1and n' is 0 or 1.

26. The method as claimed in claim 19, wherein the arylene radical $R^3$ also has halo, hydroxyl, $C_1$—$C_{12}$-alkoxy, $C_1$—$C_{12}$-dialkylamino or carboxyl groups.

27. The method as claimed in claim 19, wherein $R^6$ and $R^7$ are H, $R^6$ and $R^9$ together are O—CO—O, $R^8$ is H, $CH_3$ or $CH_2COOR^{10}$ and $R^9$ is $COOR^{10}$ or is a phenyl radical optionally substituted by hydroxyl, carboxyl or sulfo groups.

28. The method as claimed in claim 27, wherein $R^6$ and $R^7$ are H, $R^8$=H or $CH_3$ and $R^9$=$COOR^{10}$.

29. The method as claimed in claim 28, wherein $R^6$ and $R^7$ are H, $R^8$=H or $CH_3$ and $R^9$ is COOH or salts thereof or $COOR^{12}$, where $R^{12}$ is tert-butyl or $C_1$—$C_6$-hydroxyalkyl.

30. The method as claimed in claim 19, wherein the reaction of the poly (alkylene oxide) compound and the monomer compound is carried out in the presence of a inimer compound.

31. The method as claimed in claim 30, wherein the inimer compound is prepared by esterification of hydroxy-functionalized monomers with ATRP initiators.

32. The method as claimed in claim 30, wherein the inimer compound is prepared by sulfochlorination of styrene.

33. The method as claimed in claim 19, wherein the reaction is effected in the temperature range from 20 to 110° C.

34. The method as claimed in claim 19, wherein the block copolymers are used in an amount of 0.01 to 5% by weight, based on the suspension of solids.

35. The method as claimed in claim 34, wherein the suspension of solids further includes inorganic particles selected from the group consisting of crushed rock, silicate powder, chalk, clays, porcelain slip, talc, pigments and carbon black.

36. The method as claimed in claim 34, wherein the suspension of solids contains organic particles.

\* \* \* \* \*